United States Patent [19]

Morgenstern et al.

[11] Patent Number: 4,690,564
[45] Date of Patent: Sep. 1, 1987

[54] DEVICE FOR MEASURING INK DENSITY ON PRINTED SURFACES

[75] Inventors: Bernd Morgenstern, Lützschena; Helmut Weigend; Peter Reinhardt, both of Leipzig, all of German Democratic Rep.

[73] Assignee: Veb Kombinat Polygraph "Werner Lamberz" Leipzig, Leipzig, German Democratic Rep.

[21] Appl. No.: 668,074

[22] Filed: Nov. 5, 1984

[30] Foreign Application Priority Data

Nov. 14, 1983 [DD] German Democratic Rep. ... 256651

[51] Int. Cl.⁴ .................... B41F 33/00; G01N 21/47
[52] U.S. Cl. ..................... 356/445; 356/429; 362/347
[58] Field of Search ................. 356/445–448, 356/443–444, 379–380, 429, 431; 250/559, 571; 362/341, 343, 347

[56] References Cited

U.S. PATENT DOCUMENTS

| 3,191,026 | 6/1965 | Perret | 362/341 X |
| 4,003,660 | 1/1977 | Christie et al. | 356/448 X |
| 4,252,443 | 2/1981 | Lucas et al. | 356/446 X |
| 4,422,100 | 12/1983 | DuVall et al. | 362/347 X |
| 4,456,948 | 6/1984 | Brun | 362/347 X |

FOREIGN PATENT DOCUMENTS 2023467 11/1971 Fed. Rep. of Germany .

Primary Examiner—R. A. Rosenberger
Attorney, Agent, or Firm—Michael J. Striker

[57] ABSTRACT

A densitometric head for measuring ink density of prints in a running printing machine includes a light source for transmitting light on the measured surfaces and sensors for receiving the remitted light. To simplify the construction and eliminate heat effects of the light source, the latter is arranged in one focal point of an elliptic reflector whereas the measured surfaces are situated in or close to the other focal point where an image light source is formed from the light reflected in the reflector. A heat protective filter is arranged between the two focal points to eliminate heat effects on the sensor.

3 Claims, 1 Drawing Figure

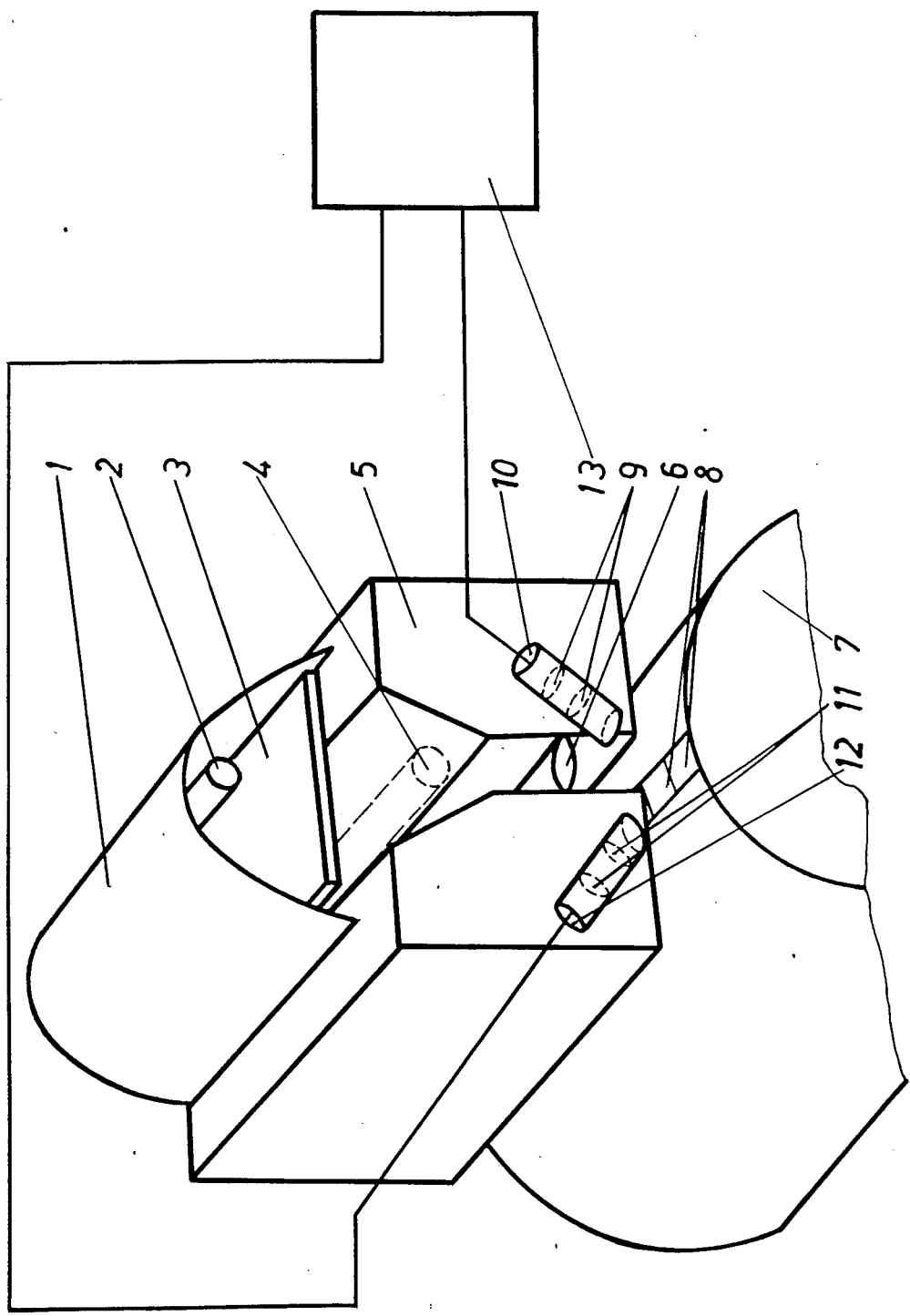

DEVICE FOR MEASURING INK DENSITY ON PRINTED SURFACES

BACKGROUND OF THE INVENTION

The present invention relates to a device for measuring ink density on a printed surface in a running printing machine.

From the German publication No. DE-OS 2023467 a device is known for measuring ink density on a running sheet fed printing press having a measuring head assembly, a light source for illuminating measuring marks on the sheets and a photometer for receiving the emitted light. In order to enable the measurement of the ink density at several locations and transversely to the direction of printing, the measuring head assembly includes either a single measuring head which is designed for adjustment in different measuring positions, or it includes a number of measuring heads corresponding to the number of measured points. The heat effects of the light source on the photometer which might cause impairment in the accuracy of measurement is eliminated by placing the light source and/or the photometer outside the range of the measuring head arrangement and connecting it by means of light conduits.

The construction of a photometer having a response time in the range of about 1 millisecond enables that at a speed of travel of the upper surface of the printed sheet of two meters per second, a minimal length of measuring marks (in the direction of printing) of 5 mm can be used.

The disadvantage of this prior art device is the high technical complexity due to the use of light conduits for eliminating the temperature effects of the light source on the photometer, and in addition the strong dependency of the measuring accuracy on the speed of travel of the upper surface of the printed sheet.

SUMMARY OF THE INVENTION

It is therefore a general object of the present invention to overcome the aforementioned disadvantages.

More particularly, it is an object of this invention to provide an improved ink density measuring device of the aforedescribed kind which has a higher measuring accuracy at lower technological expenditures.

Another object of this invention is to provide such an improved device in which the effects of temperature on the photoelectric components is reduced by using simpler means.

A further object of this invention is to improve the measuring accuracy even at a variable speed of the prints.

In keeping with these objects and others which will become apparent hereafter, one feature of the invention resides in a combination which comprises a light source arranged in one focal point of an elliptic reflector whereby the latter is constructed such that its second focal point coincides with the measured surfaces in the running printing machine.

A heat protecting filter is arranged between the two focal points, thus making it possible to design the device in an advantageously simpler manner.

It is also of advantage when the elliptic reflector is oriented so that its two focal points form right angles with the measured surfaces.

In another embodiment of this invention, the light source is a source of infrared light.

By virtue of the arrangement according to this invention, the heat effects of the light source on the sensors of the remitted light are substantially reduced and the light source by suitably dimensioning the reflector can be brought to a very small distance from the measured marks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows in a schematic perspective view the construction of the densitometric head of this invention.

DESCRIPTION OF THE PREFERRED EMBODIMENT

In the illustrated example of a densitometric head, a light source 2 in the form of a pulse operated gas discharge lamp, is arranged in one focal point of an elliptic reflector 1. In order to reduce heat effects, a heat protective filter 3 is provided between the one focal point and a second focal point of the reflector and the path of reflected light is delimited by a narrow exit gap between two trapezoidal blocks 5 supporting the reflector 1. The slanted sides of respective blocks face the second focal point. In the second focal point, an image 4 of the light source is formed due to the reflected light and this image by suitable design of the reflector 1, can be brought to an immediate proximity above measured marks 8 on the print. If the configuration of the densitometric head of this invention is selected such that the image 4 of the light source is placed a larger distance from the measuring mark 8, than in order to achieve parallel light rays, a corresponding optical lens system 6 is located in the path of emitted light in the densitometric head.

Marks 8 to be measured extend transversely to the feeding direction of a printed sheet mounted on the printing cylinder 7.

Light reflected from the measured marks 8 is sensed by two sensors 10 and 12 which are arranged above the marks at an angle of about 90° relative to each other, and the sensed light is converted in corresponding electrical signals. The detected electrical signals are applied to an evaluation device 13 where they are correlated to corresponding values of ink density.

In the preferred embodiment of the evaluation device 13, the signals are scanned and stored and subsequently processed in a computer which is programmed for evaluating the scanned signals from the sensor and to output the ink density values.

In order to measure ink density values of colored measuring marks 8, corresponding color filters are arranged before optical elements 9 and 11 in respective sensors 10 and 12 to select the desired color.

The color filters can be also arranged in the path of the emitted light apart from the path of the remitted light in the sensors 10 and 12.

By using an image 4 of the actual light source in the second focal point of the elliptic reflector 1 as the effective light source for illuminating the measured marks 8, the distance between the effective light source and the measuring marks can be adjusted as low as to zero. Expensive optical systems can be dispensed with. The effects of diffused reflected light on the measurement are reduced to minimum and consequently, the measuring accuracy is increased. A further increase in measuring accuracy is achieved by suppressing thermal effects of the light source on the working points of sensors 10 and 12. The thermal effect is suppressed either by electing a sufficiently large clearance between the actual light source 2 and the image light source 4, or by placing the beforementioned heat protecting filter 3 between the two focal points of the reflector 1.

It will be understood that each of the elements described above, or two or more together, may also find a useful application in other types of constructions differing from the types described above.

While the invention has been illustrated and described as embodied in a specific example of the ink density measuring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for measuring ink density on a measured surface of a printed material in a running printing machine, comprising an elliptic reflector having two focal points, one of said focal points being completely enclosed in said reflector, an actual light source arranged in said one focal point so as to generate an image light source in the other forcal point which is equivalent to the actual light source, means for directing a narrow light beam from said image light source at right angles to the measured surface, light sensors provided above the measured surface to detect remitted light, and evaluating means for converting the signals from the sensors into ink density values.

2. A device as defined in claim 1, wherein a heat protective filter is arranged between the two focal points of the reflector.

3. A device as defined in claim 1, wherein the actual light source is an infrared light source.

* * * * *